US012680929B2

(12) United States Patent
Michopoulos et al.

(10) Patent No.: US 12,680,929 B2
(45) Date of Patent: Jul. 14, 2026

(54) METHODS AND APPARATUSES FOR FATIGUE TESTING OF STRUCTURAL COMPONENTS

(71) Applicant: The Government of the United States, as represented by the Secretary of the Navy, Arlington, VA (US)

(72) Inventors: John G. Michopoulos, Washington, DC (US); Athanasios P. Iliopoulos, Bethesda, MD (US); John C. Steuben, Washington, DC (US); Benjamin Graber, College Partk, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 177 days.

(21) Appl. No.: 18/383,646

(22) Filed: Oct. 25, 2023

(65) Prior Publication Data

US 2024/0133783 A1 Apr. 25, 2024
US 2024/0230492 A9 Jul. 11, 2024

Related U.S. Application Data

(60) Provisional application No. 63/419,135, filed on Oct. 25, 2022.

(51) Int. Cl.
*G01N 3/08* (2006.01)
*G01N 3/06* (2006.01)
*G01N 3/32* (2006.01)

(52) U.S. Cl.
CPC ............... *G01N 3/08* (2013.01); *G01N 3/068* (2013.01)

(58) Field of Classification Search
CPC .. G01N 3/08; G01N 3/04; G01N 3/02; G01N 3/068; G01N 3/24; G01N 3/10;
(Continued)

(56) References Cited

U.S. PATENT DOCUMENTS

| | | |
|---|---|---|
| 3,295,224 A | 1/1967 | Cappel |
| 8,978,480 B2 | 3/2015 | Michopoulos |
| 11,835,400 B2 * | 12/2023 | Tu ........................... G01L 5/167 |

FOREIGN PATENT DOCUMENTS

KR 20150014301 A * 2/2015 ............... G01N 3/42

OTHER PUBLICATIONS

Michopoulos, J., et al., "Towards the Robotic Identification of Constitutive Response of Composite Materials," Composite Structures, vol. 86, Issues 1-3, pp. 154-164, Nov. 2008.
Iliopoulos, A., et al., "Direct strain tensor approximation for full-field strain measurement methods," Int. J. Numer. Meth. Engng,, vol. 95, Issue 4, pp. 313-330, Jul. 27, 2013.
Iliopoulos, A., et al., "Crack Growth in a Range of Additively Manufactured Aerospace Structural Materials," Aerospace, vol. 5, No. 4, 118, 19 pages, Nov. 9, 2018.
(Continued)

*Primary Examiner* — Brandi N Hopkins
(74) *Attorney, Agent, or Firm* — US Naval Research Laboratory; Scott C. Hatfield

(57) ABSTRACT

Methods and apparatuses for multiple degree-of-freedom fatigue testing of a specimen. The apparatus includes a first platform, a second platform, a plurality of actuator assemblies, a load cell, a mounting plate, a specimen support, a direct-strain imaging system, and a local sense and control system. Each actuator assembly includes a servo-control, a position encoder, and a piston that is constructed to move in a linear direction in accordance with the servo-control. Each piston is rotatably connected to the second platform. The load cell is connected to the second platform and constructed to output force measurements in three orthogonal directions and torque measurements about the three orthogonal directions. The mounting plate is constructed to hold a portion a specimen. The specimen support is constructed to hold another portion of the specimen. The direct-strain-imaging system includes a camera that is constructed to record a
(Continued)

plurality of images of the specimen during fatigue testing. The local sense and control system constructed to receive: a loading specification, the force measurements and torque measurements from the load cell, and position information from each position encoder, and output control commands to each servo-control of the plurality of actuator assemblies based on the received loading specification. The control commands are updated in time in accordance with the position information from each position encoder and the force measurements and torque measurements from the load cell.

10 Claims, 14 Drawing Sheets

(58) Field of Classification Search
CPC ...... G01N 23/046; G01N 33/383; G01N 3/56; G01N 3/34; G01N 33/30; G01N 3/00; G01N 3/38; G01N 19/02; A61B 5/1126; G01B 11/16; A61F 2/76; G01M 17/00; G01M 13/00; G01M 99/007; G01M 13/021; B25J 13/085; B25J 9/0006; G01L 25/00; C12M 21/08; G01R 1/073
See application file for complete search history.

(56) References Cited

OTHER PUBLICATIONS

Shawki, G. S. A., "A review of fatigue testing machines," Engineering Journal of Qatar University, vol. 3, pp. 55-69, 1990.
Michopoulos, J. G., et al., "Towards a Recursive Hexapod for the Multidimensional Mechanical Testing of Composites," in ASME 2010 International Design Engineering Technical Conferences and Computers and Information in Engineering Conference, Montreal, Quebec, Canada, 9 pages, Aug. 2010.
Morrison, J.L.M., et al., "Fatigue under Triaxial Stress: Development of a Testing Machine and Preliminary Results," Proc. Instn Mech. Engrs, vol. 170 , No. 21, pp. 697-712, 1956.
Michopoulos, J. G., et al., "Data-Driven Design Optimization for Composite Material Characterization," J. Comput. Inf. Sci. Eng., vol. 11, No. 2, 021009, 11 pages, Jun. 2011.
Michopoulos, J.G. et al., "Design of NRL66.4: An Electro-Hydraulic 6-Dof Parallel Robotic Multiaxial Material Testing System," in ASME 2019 International Design Engineering Technical Conferences and Computers and Information in Engineering Conference, Anaheim, California, USA, 16 pages, Aug. 2019.
Gough, V.E., "Response: A Platform with Six Degrees of Freedom," Proc. UK Inst. Mech. Eng. 1965, vol. 180, Pt. 1, No. 15, pp. 379-381, 1965-1966.
Stewart, D., "A platform with six degrees of freedom," Proc. UK Inst. Mech. Eng. 1965, vol. 180, Pt. 1, No. 15, pp. 371-378, 1965-1966.

* cited by examiner

METHODS AND APPARATUSES FOR FATIGUE TESTING OF STRUCTURAL COMPONENTS

CROSS-REFERENCE TO RELATED APPLICATIONS

This application claims priority to U.S. Patent Application No. 63/419,135, filed Oct. 25, 2022, the contents of which are incorporated by referenced herein in their entirety.

BACKGROUND

Field of the Invention

The present application relates generally to methods and apparatuses for fatigue testing of structural components.

Description of Related Art

The twentieth century saw a rapid explosion in the field of material design. As manufacturing capabilities expanded, new materials were created to meet the ever growing needs of an industrialized society. This drive to create new materials to meets society's needs continues to this day. But as new materials were developed, another field of equal importance was created: the field of material testing. While a new material could be designed "on the chalkboard", before it could be used its properties must be determined to ensure that it was suitable for the intended purpose. Simple machines to test and quantify the properties of a material proved to be deficient. These machines had limited degrees of freedom and thus could provide only limited information about how a material would perform. Since many materials may experience loads and stresses from more than one degree of freedom it is important to have the capability to test materials in analogous manner to how the material may be used. Typical fatigue testing machines can be classified by their method of load application, such methods include: spring forces or dead weights, centrifugal forces, hydraulic forces, pneumatic forces, thermal dilation forces, or electro-magnetic forces and ultrasonic actuation forces. For structural components that are members of larger superstructures (e.g., an aircraft, a ship, ground vehicle, a bridge, or a building), the time evolution of the forces or displacements applied on them can be deterministically arbitrary, periodic (cyclic) or random. Conventional fatigue testing systems, however, apply only cyclic forces (sinusoidal) in time loading.

Cyclical fatigue testing machines can be further divided into two groups: single degree-of-freedom (sDoF) and multiple degree-of-freedom (mDoF) machines. In a sDoF machine, a displacement or force is applied along a single degree of kinematic freedom as a cyclic function of time. This displacement or force can be a tension/compression, a torsion, or a bending motion. The vast majority of conventional fatigue testing machines fall within the sDoF category. Conventional mDoF machines are generally limited to a maximum of three degrees-of-freedom. The most prevalent mDoF machines are two degrees-of-freedom machines that can apply axial with torsional, or bending with torsional, motions as a sinusoidal function of time. One limitation of conventional fatigue testing machines is that they cannot test a specimen defined by an arbitrary combination of any number of base loadings defined in a generalized six degrees-of-freedom kinematic and force space. Another deficiency is that there exists a trade-off between the amplitude and frequency of the applied cyclic motion, which penalizes the range of applicability of such systems, especially in the case of multiple degree-of-freedom systems. When high frequencies can be achieved, the kinematic amplitude and the forces that are achievable are small. And when high kinematic amplitude and forces are achieved, the available frequency range shortens significantly. If one defines the ability to perform both high frequency (above 5 Hz) and high force or kinematic amplitudes as "high authority", then the inventors are unaware of any high authority mDoF fatigue testing machines. Furthermore, there are no mDoF fatigue testing machines that can perform high authority mutiaxial loading with multispectral content along different or combined DoFs or apply loads that are arbitrary functions of time across individual or combined DoFs. Thus, it would beneficial to have methods and apparatuses for performing fatigue testing that mitigate some of these deficiencies.

SUMMARY OF THE INVENTION

One or more the above limitations may be diminished by structures and methods described herein.

In one embodiment, an apparatus for fatigue testing of a specimen is provided. The apparatus includes a first platform, a second platform, a plurality of actuator assemblies, a load cell, a mounting plate, a specimen support, a direct-strain imaging system, and a local sense and control system. Each actuator assembly includes a servo-control, a position encoder, and a piston that is constructed to move in a linear direction in accordance with the servo-control. Each piston is rotatably connected to the second platform. The load cell is connected to the second platform and constructed to output force measurements in three orthogonal directions and torque measurements about the three orthogonal directions. The mounting plate is constructed to hold a portion a specimen. The specimen support is constructed to hold another portion of the specimen. The direct-strain-imaging system includes a camera that is constructed to record a plurality of images of the specimen during fatigue testing. The local sense and control system is constructed to receive: a loading specification, the force measurements and torque measurements from the load cell, and position information from each position encoder, and output control commands to each servo-control of the plurality of actuator assemblies based on the received loading specification. The control commands are updated in time in accordance with the position information from each position encoder and the force measurements and torque measurements from the load cell.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

3

Figure 3A:
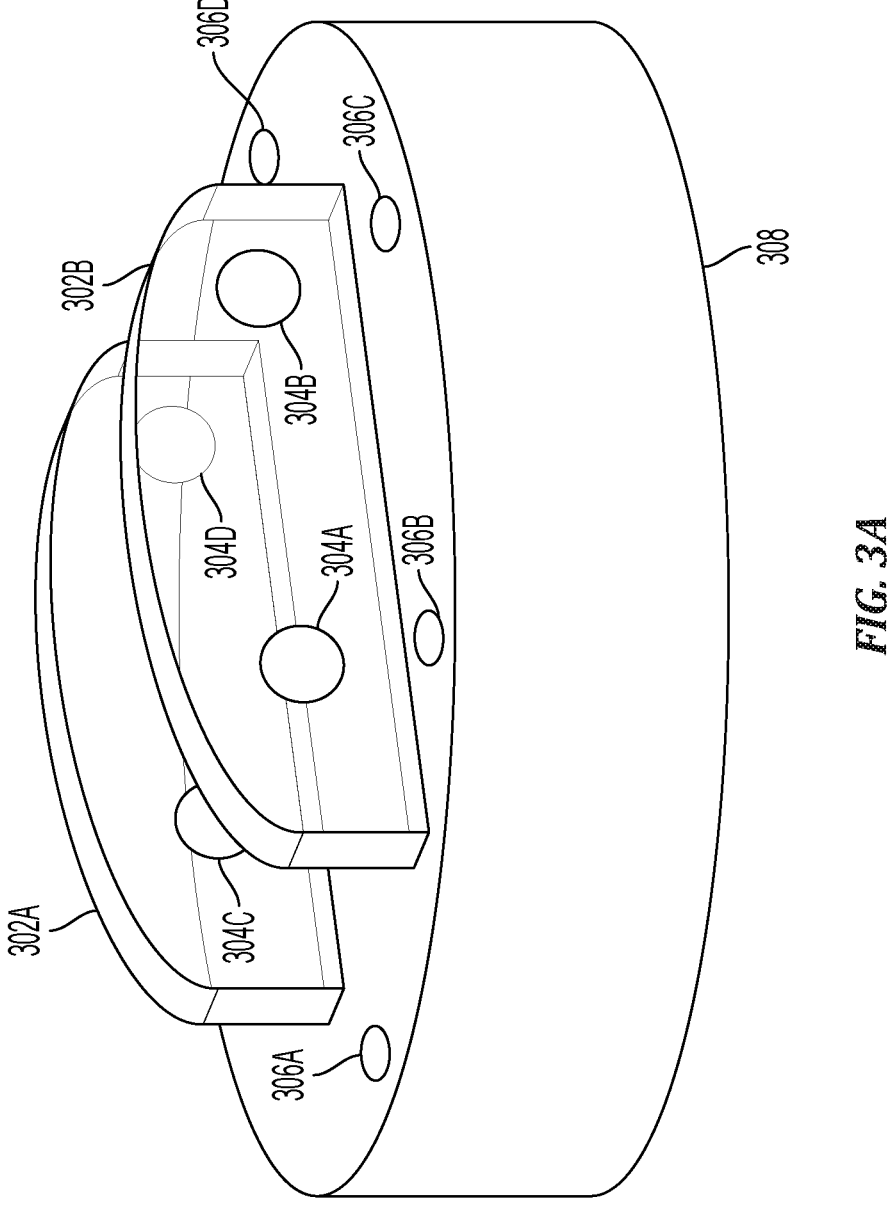
FIG. 3A is a perspective view of an exemplary mounting plate according to one embodiment.
Figure 3A:
Figure 3B:
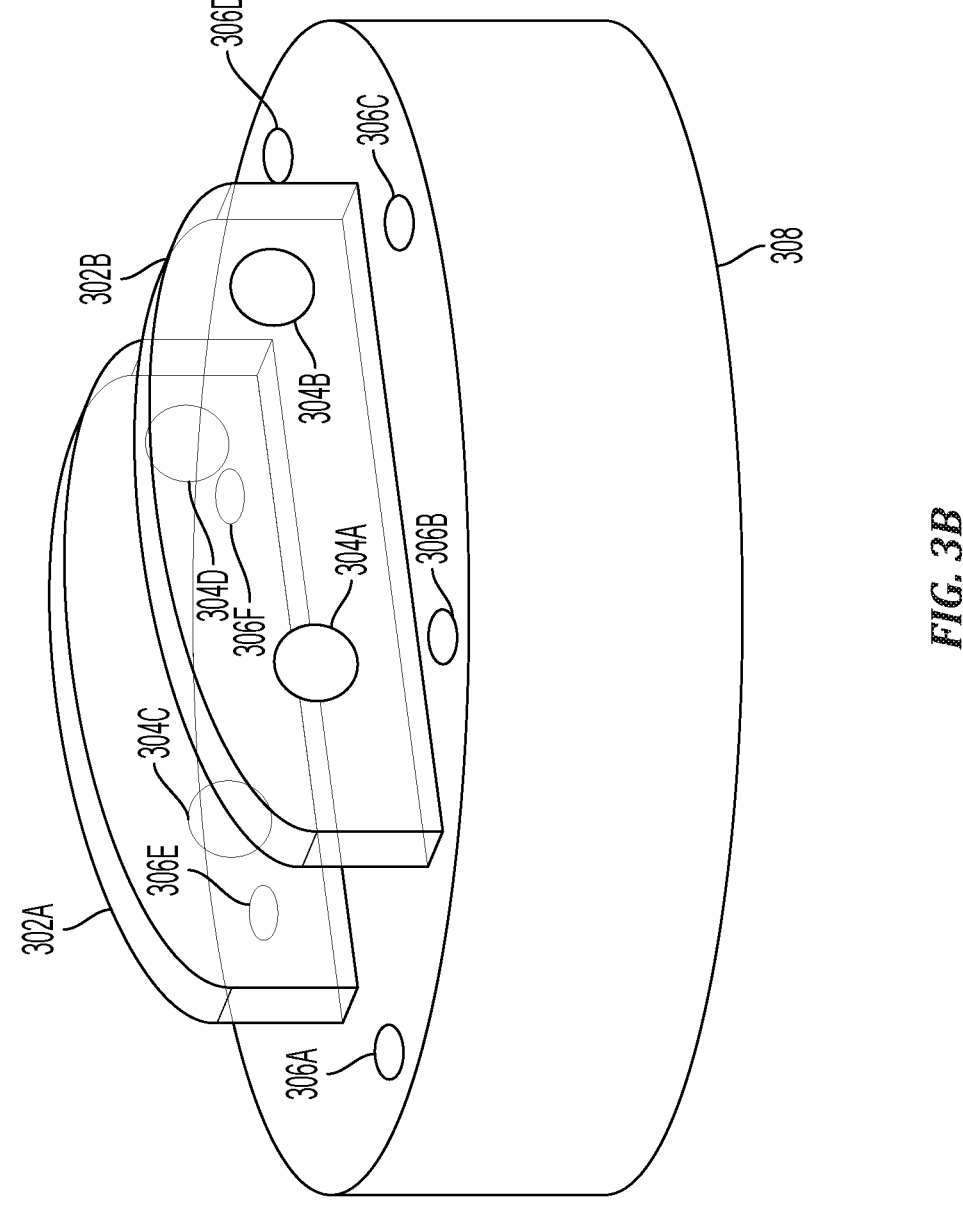
Figure 3B:
Figure 4:
Figure 5:
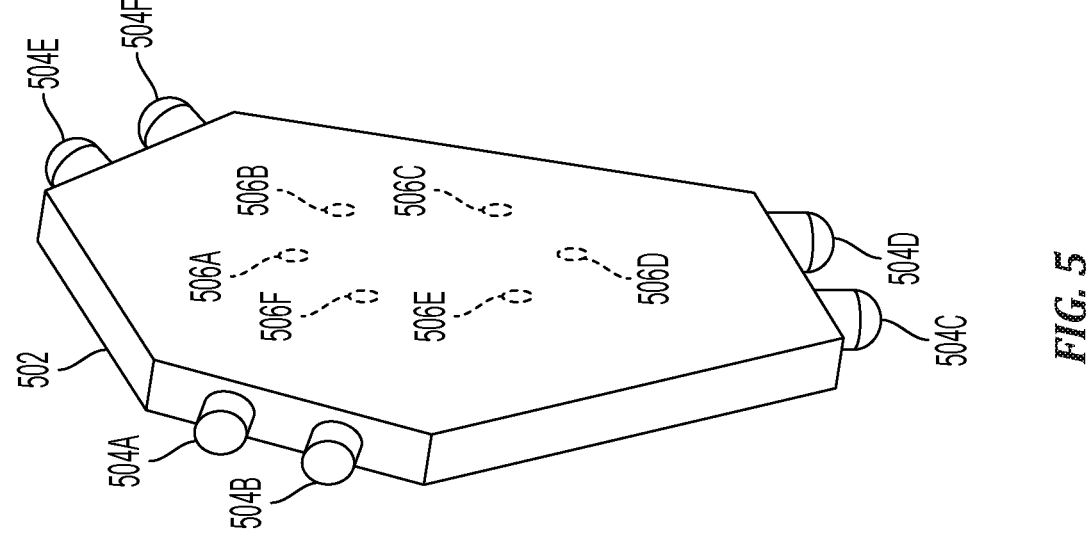
Figure 5:
Figure 6:
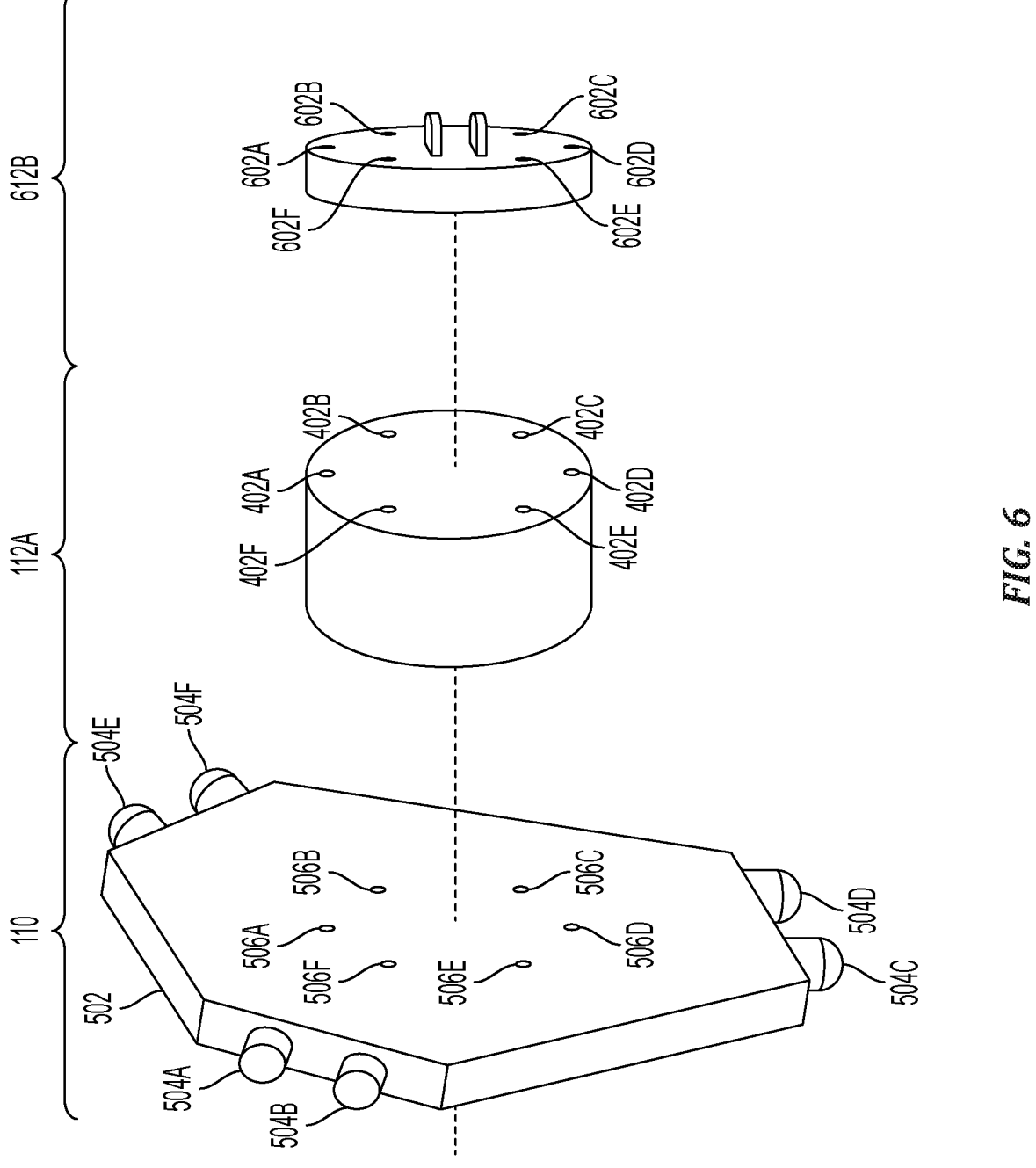
Figure 7A:
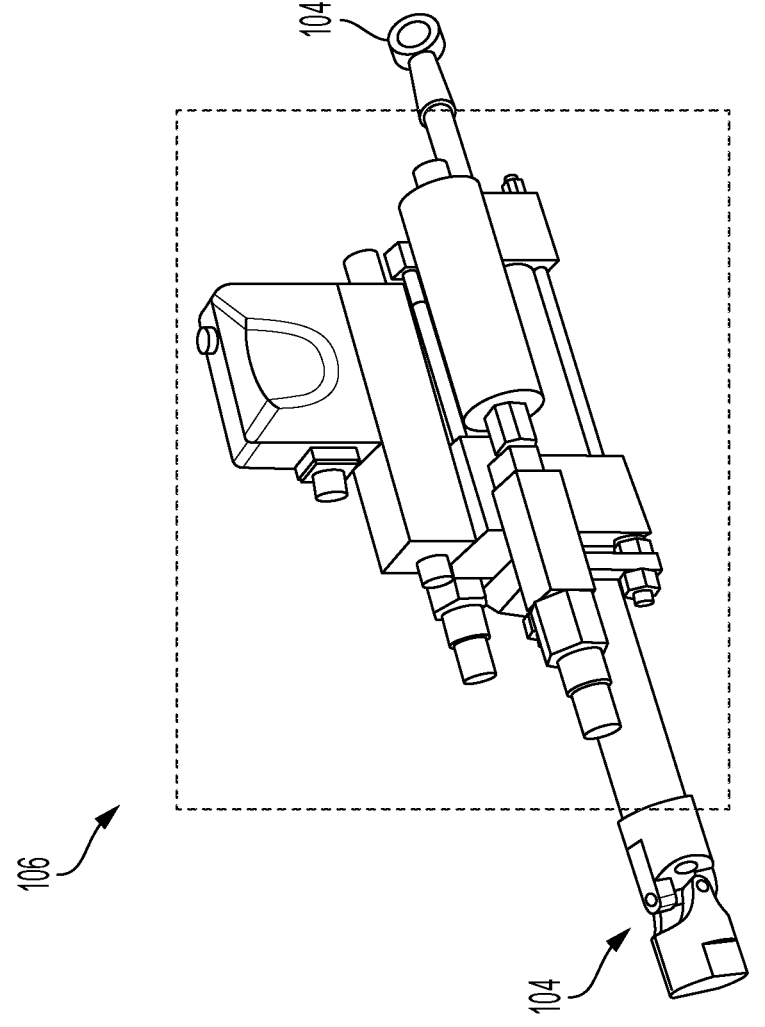
Figure 7B:
Figure 7C:
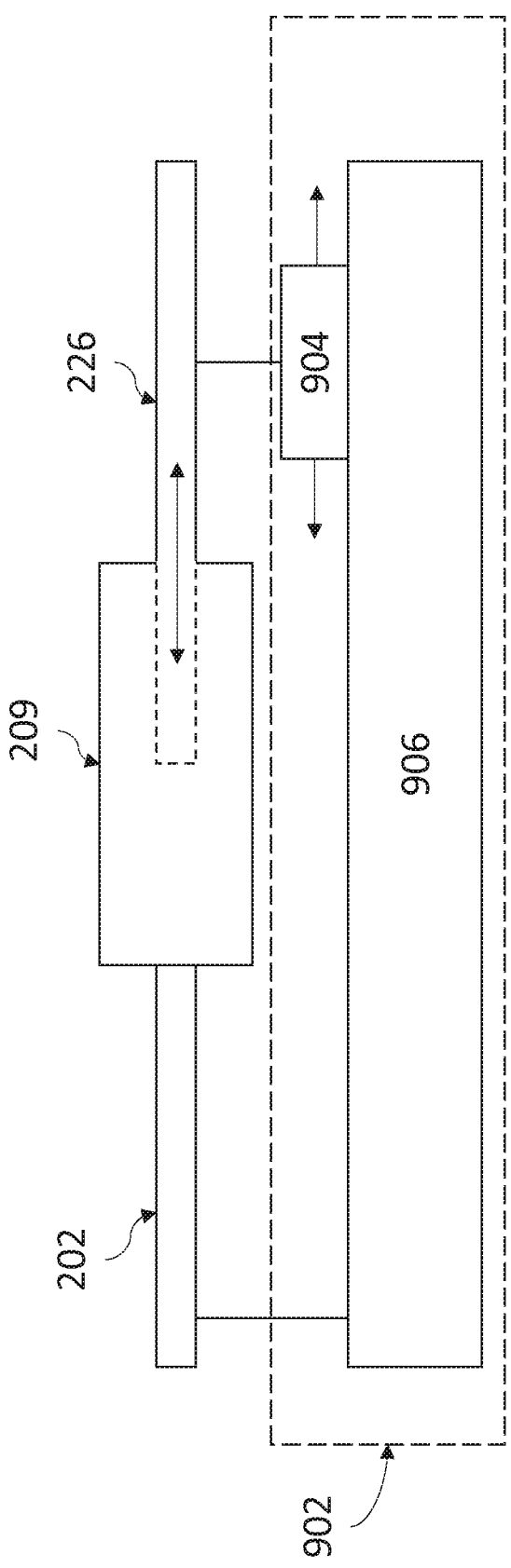
Figure 8:
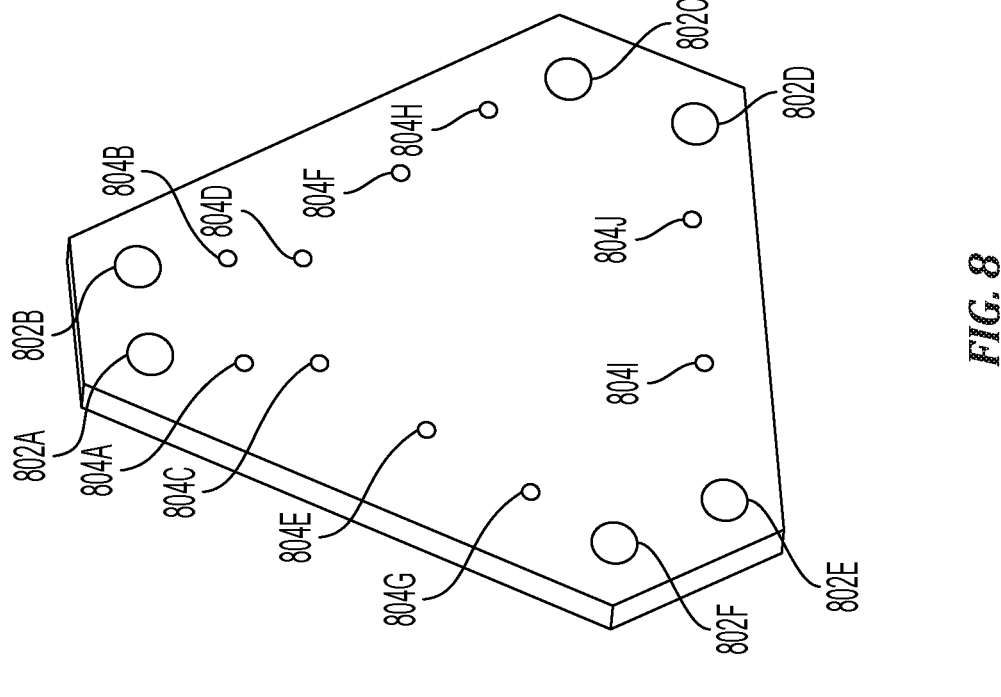
Figure 9:
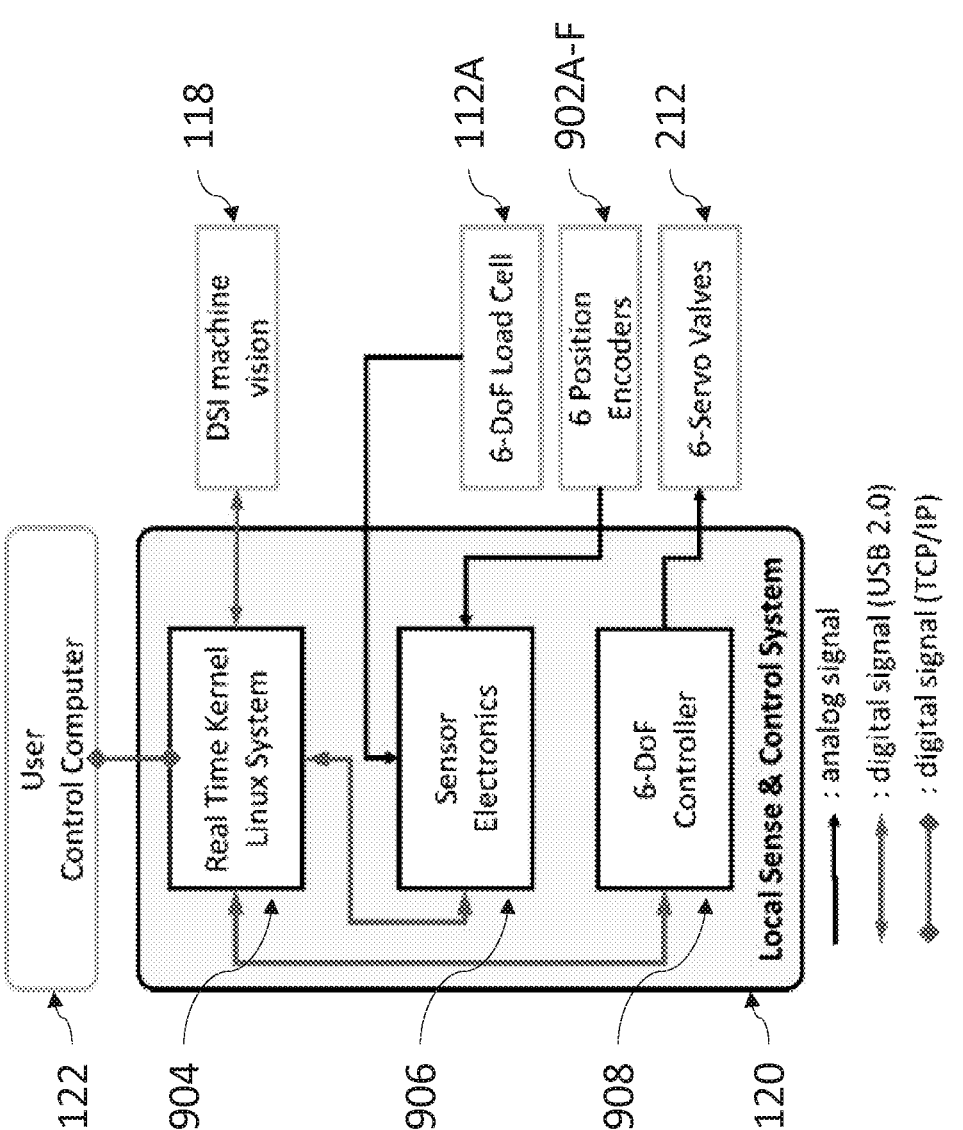
Figure 10:
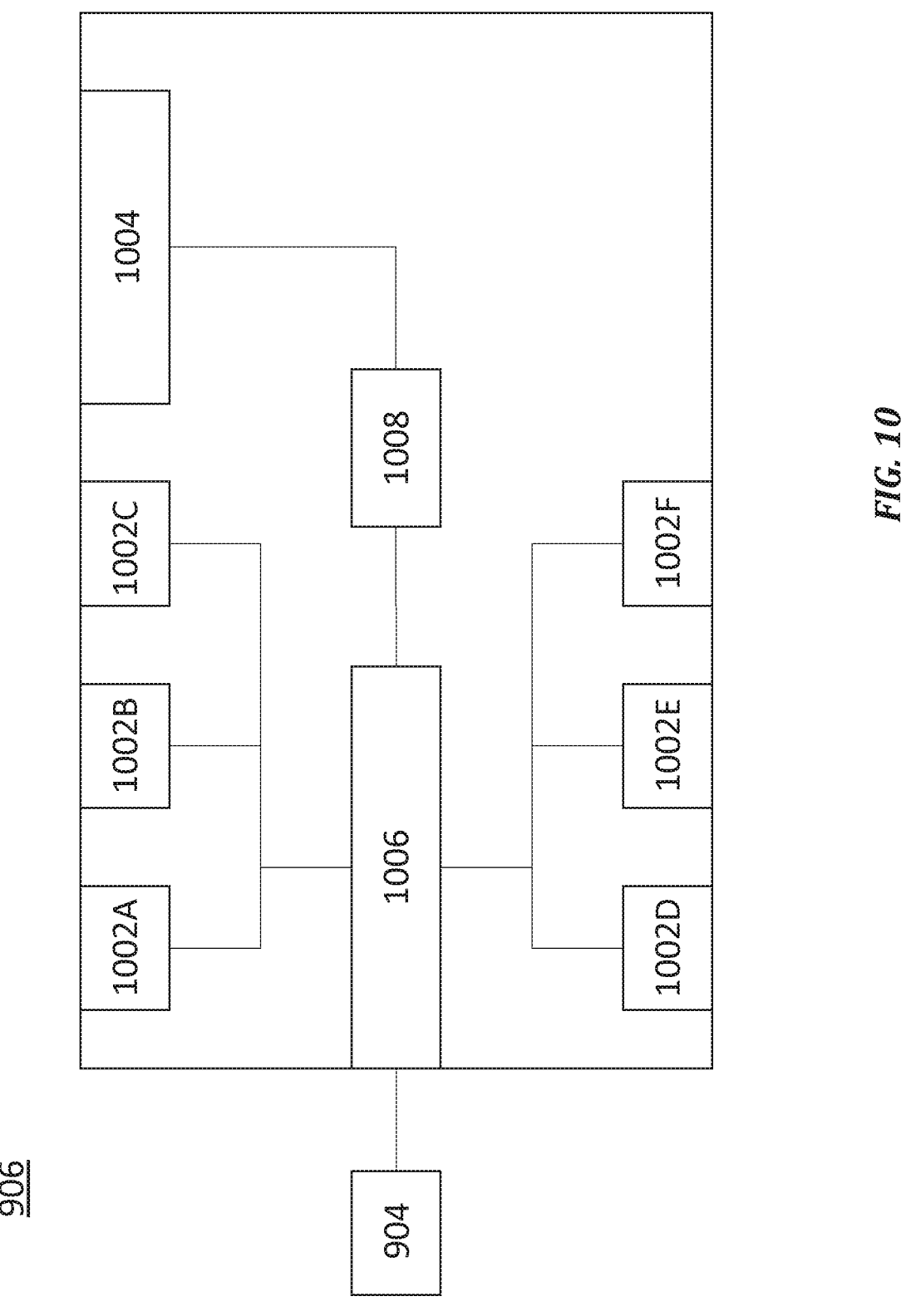
Figure 11:
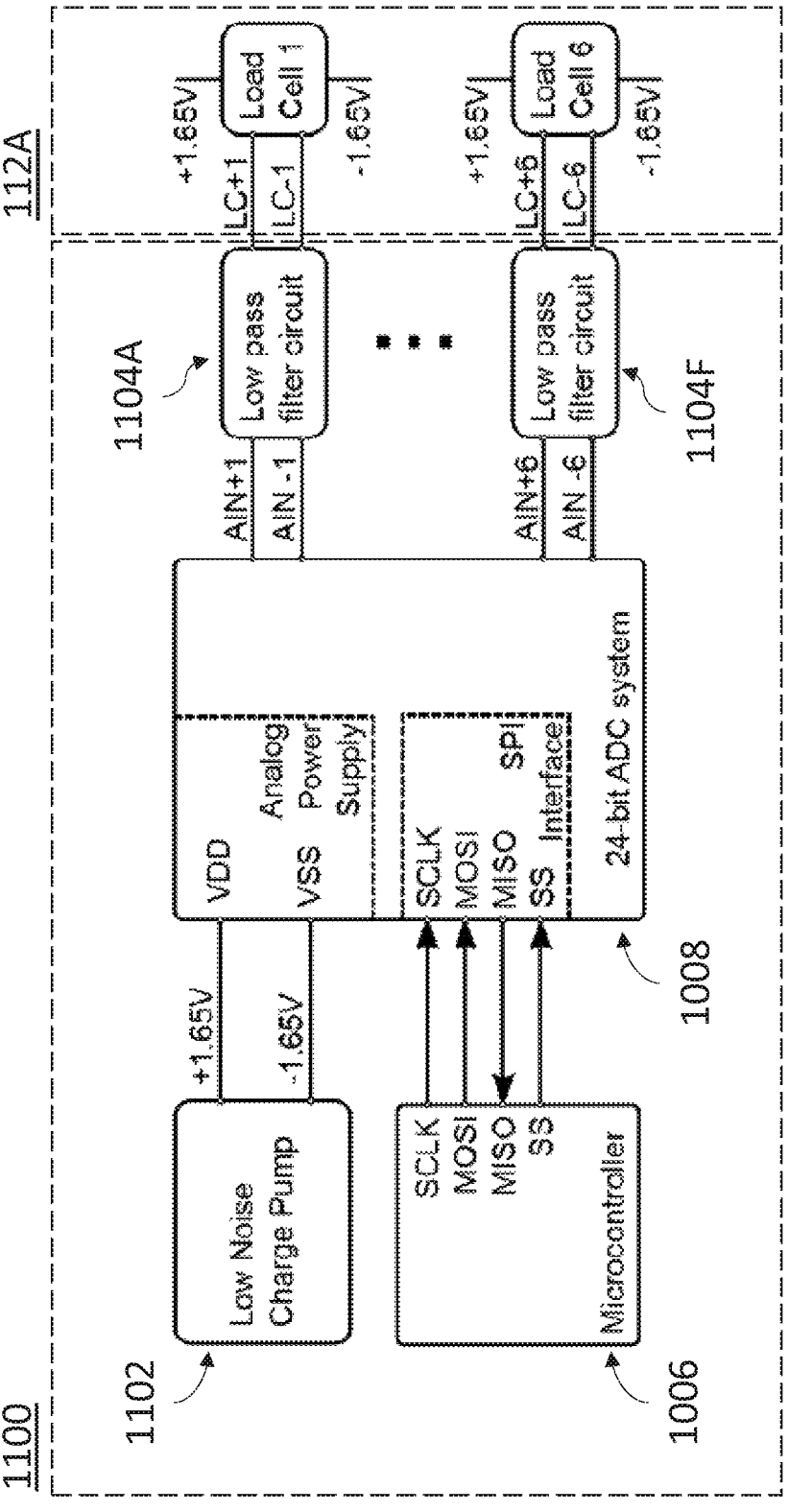

FIG. 3B is the same image as FIG. 3A except the flanges are shown as transparent to allow full visualization of the mounting plate;

FIG. 4 depicts an exemplary load cell according to one embodiment;

FIG. 5 is a perspective view of the exemplary second platform;

FIG. 6 is an exploded view that shows an exemplary second platform, load cell and mounting plate disposed along a coaxial line according to one embodiment;

FIG. 7A is a perspective view of a first joint, a second joint, and an actuator assembly according to one embodiment;

FIG. 7B is an exploded view of the first joint, the second joint, and the actuator assembly 106 shown in FIG. 7A;

FIG. 7C illustrates the operation of an exemplary position encoder and its connection to other portions of an exemplary actuator assembly;

FIG. 8 is a perspective view of an exemplary first platform according to one embodiment;

FIG. 9 is a communications diagram showing the communications between components of the computational stack and the electromechanical system, according to one embodiment;

FIG. 10 is a schematic communications diagram showing the connections of the sensor electronics according to one embodiment; and FIG. 11 is a schematic communications diagram showing connections between components of sensor electronics 906, which may be located on a printed circuit board, and the load cell according to one embodiment.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

Figure 1:
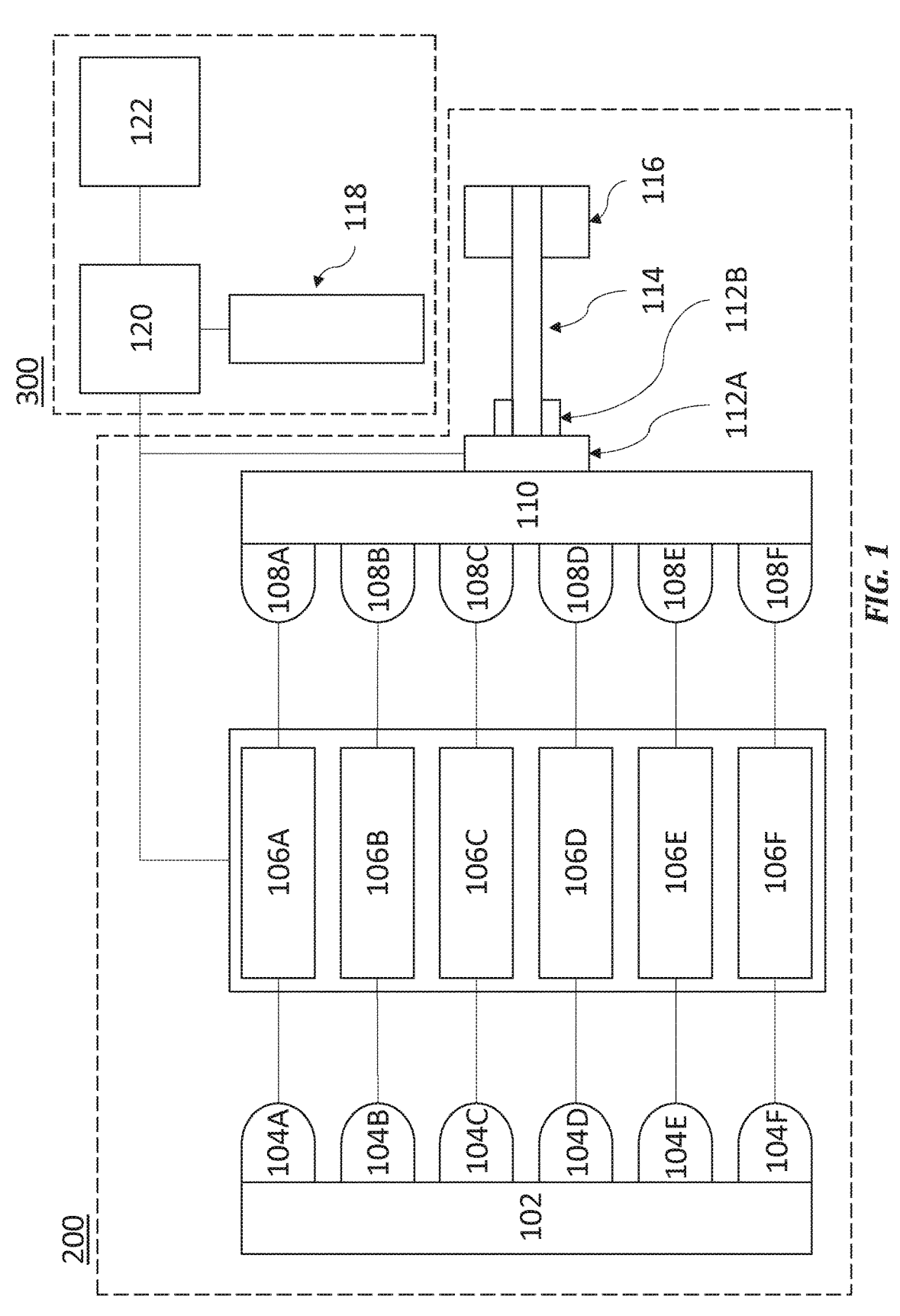
FIG. 1 is a schematic view of a fatigue testing system 100 according to one embodiment.
Figure 2:
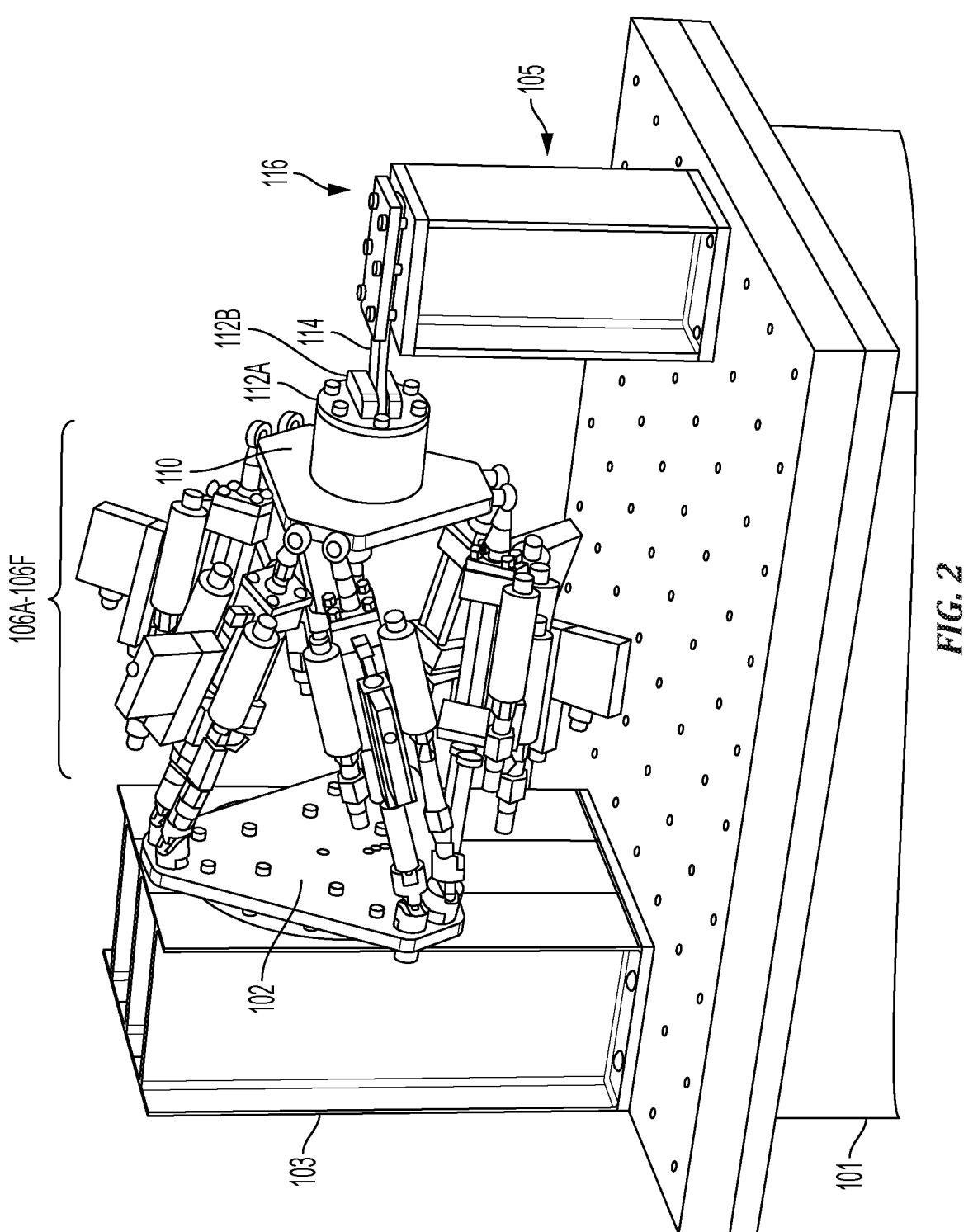
FIG. 2 is a perspective view of an exemplary embodiment of a fatigue testing system.

In accordance with example aspects described herein are methods and apparatuses for fatigue testing. FIG. 1 is a schematic view of a fatigue testing system 100 according to one embodiment. FIG. 1 shows two of the components of system 100: an electromechanical stack 200 and a computational stack 300. FIG. 2 is a perspective view of an exemplary embodiment of system 100 where system 100 is mounted to a table 101 via support structures 103 and 105. Beginning with the electromechanical stack 200, as shown in FIG. 1, a first platform 102 is provided. The first platform 102, in a preferred embodiment, is a fixed platform that does not appreciably move. Attached to the first platform 102 are a plurality of first joints 104A-104F. In a preferred embodiment, the plurality of first joints 104A-104F are universal joints. The universal joints may be the type which include a joint or coupling connecting ridged shafts who axes are inclined to each other. Connected to the plurality of first joints 104A-104F are a plurality of actuator assemblies 106A-106D, respectively. An exemplary embodiment of an actuator assembly that could function as the plurality of actuator assemblies 106A-106D is described in detail below with reference to FIGS. 7A-7C. The plurality of actuator assemblies 106A-106D are also connected to a plurality of second joints 108A-108F, respectively. In a preferred embodiment, the plurality of second joints 108A-108F are spherical joints. The plurality of second joints 108A-108F are connected to a second platform 110. As discussed in detail below, one of the features of each of the actuator assemblies 106A-106F is that a portion thereof is movable in a linear direction. By orienting the plurality of actuator assemblies 106A-106F such that the portions thereof which is movable in a linear direction connect to the plurality of second joints 108A-108F, which in turn are connected to the second platform 110, it is possible to control the motion of the second platform 110, the force applied to the second platform 110, and the torque applied to the second platform 110, by controlling the plurality of actuator assemblies 106A-106F. A local sense and control system 120 is provided for that purpose and is described below in detail.

Attached to the second platform 110 is a load cell 112A and a mounting plate 112B for the load cell 112A. The load cell 112A is, in a preferred embodiment, a six degrees-of-freedom load cell that outputs forces in three orthogonal directions (x, y, and z axes) and the amount of torque about those axes. As shown in FIG. 1, the output of load cell 112A is provided to a local sense and control system 120. The mounting plate 112B is connected to the load cell 112A by bolts, screws, or other mechanical or chemical fasteners (e.g., an epoxy, glue, or resin). Any manner of connection which ensures that the mounting plate 112B and the load cell 112A will remain connected during the operation of the system 100 is appropriate. The mounting plate 112B is constructed to accommodate and secure a portion of test specimen 114, which is a material to be tested. As one of ordinary skill will appreciate, there are a variety of ways to secure specimen 114 to the mounting plate 112B and in turn the load cell 112A. In one embodiment, the mounting plate 112B may include a plurality of holes for screws, bolts, or other fasteners. When a fastener is placed through the hole it may pass through a portion of the specimen thereby securing it to the mounting plate 112B. Another portion of specimen 114 is connected to structural component 116, which acts as a specimen support and does not appreciably move. In a similar manner to the mounting plate 112B, and as shown below, the structural component 116 may include a plate with a plurality of holes through which a plurality of screws, bolts, or other fasteners may pass. The plurality of screws, bolts, and other fasteners may pass through the specimen 114 and be connected to another portion of the structural component 116. By tightening the plurality of screws, bolts, or other fasteners in place, the specimen 114 may be securely connect to the structural component 116. A glue, epoxy, or resin may also be used in place of or in conjunction with a mechanical fastener.

Having described the components of the electromechanical stack 200, attention will now be directed to the components of the computational stack 300. The computational stack 300 includes: a digital strain imaging (DSI) subsystem 118, a local sense and control system 120, and a computer 122. As discussed above, the local sense and control system 120 receives the outputs from the load cell 112A. In addition, however, the local sense and control system 120 also receives the outputs from a plurality of encoders 902A-F that respectively connected to the plurality of actuator assemblies 106A-106F, as discussed below. Still further, the local sense and control system 120 can also receive data from the DSI subsystem 118, explained below. A user can control the operation of the local sense and control system 120 through a computer 122, including providing a loading specification to the local sense and control system 120 via computer 122. Based on some or all of the inputs, the local sense and control system 120 may output control signals to a plurality of servo valves 212 respectively corresponding to the plurality of actuator assemblies 106A-106F. The signals supplied to the plurality of servo valves 212 cause the piston 226 of each of the plurality of actuator assemblies 106A-106F to extend or retract (in a controlled time period) so as to move the second platform 110 and/or impart a force and/or a torque on the specimen 114. The load cell 112A detects the forces applied to specimen 114 in the three orthogonal direction and the torque applied about those directions and provides that data to the local sense and control system 120. In addition, the DSI subsystem 118 monitors movement of specimen 114 in response to the applied force and torque and outputs that information to the local sense and control system 120, as explained below.

While the embodiment shown in FIG. 1 shows the local sense and control system 120 as separate from the computer 122, in another embodiment the local sense and control system 120 may be included within computer 122 as a separate controller. Or, in yet another embodiment, computer 122 may include a processor, memory, and input/output hardware that work cooperatively to perform the functions of the local sense and control system 120 described herein. Having described the components and interrelationships of the electromechanical stack 200 and the computational stack 300, attention will now be directed to an exemplary electromechanical stack 200.

The following discussion of an exemplary electromechanical stack 200 will generally proceed from right-to-left in FIG. 2 beginning with the mounting plate 112B. However, as discussed below and appreciated by one of ordinary skill, the following discussion of the specific system shown in FIG. 2 is merely exemplary. One of ordinary skill will recognize that variations to the electromechanical stack 200 could be made that would depart from these figures but still fall within the scope of this invention. For example, the shape of the first platform 102 and the second platform 110 are generally triangular, but could also be circular or any other shape.

FIG. 3A is a perspective view of a mounting plate 112B according to one embodiment. As shown in FIG. 3A, the mounting plate 112B includes two attachment flanges 302A and 302B connected to a base 308. A specimen 114 may be positioned, in this embodiment, between these flanges 302A and 302B and then bolts may be passed through holes 304A-304D and specimen 114 to securely attach specimen 114 to mounting plate 112B. FIG. 3B is the same image as FIG. 3A except the flanges are shown as transparent to allow full visualization of holes 304C and 304D, as well as holes 306A-F which allow the mounting flange to connect to the load cell 112A. As a person of ordinary skill will appreciate, the dimensions of the flanges 302A and 302B may vary based upon the dimensions of specimen 114. Since the mounting plate 112B is removable, another mounting plate with a smaller distance between the flanges 302A and 302B may be used for specimens with smaller thicknesses. In another embodiment, flanges 302A and 302B are mounted on guides and may be repositioned in plane defined by a top surface of the mounting 112B (as shown in FIGS. 3A and 3B) to accommodate different specimens. Having described the mounting plate 112B, attention will now be directed to the load cell 112A.

FIG. 4 depicts an exemplary load cell 112A according to one embodiment. As shown in FIG. 4, the load cell 112A includes a plurality of holes 402A-402F for receiving screws, bolts, or other fasteners that have passed through holes 306A-F of the mounting flange 112B. The load cell 112A contains internal circuitry that calculates an applied force in three orthogonal directions and the amount of torque about those directions, and includes an output that allows that information to outputted. An exemplary load cell 112A is manufactured by Interface Force Measurement Solutions. However, as one of ordinary skill will recognize other load cells may be used depending on the design of system 100 and those load cells may have a different hole pattern than load cell 112A shown in FIG. 4. In a preferred embodiment, the number of holes and their arrangement are the same for load cell 112A and mounting plate 112B. Having described the load cell 112A, attention will now be directed to the second platform 110.

FIG. 5 is a perspective view of an exemplary second platform 110, according to one embodiment. The second platform includes a plurality of studs 504A-F respectively corresponding to the plurality of actuator assemblies 106A-106F. The plurality of studs 504A-F include a ball portion at a distal end. The ball portion of studs 504A-F provide a mount for the plurality of second joints 108A-108F which, in this exemplary embodiment, are spherical joints. Also included in the second platform 110 are a plurality of holes 506A-506F that are constructed to receive a screw, bolt, or other fastener that has been inserted into corresponding holes in the load cell 112A and/or mounting plate 112B so as to attach the second platform 110, load cell 112A and mounting plate 112B to each other. FIG. 6 is illustrative. FIG. 6 is an exploded view that shows the exemplary second platform 110, load cell 112A and a mounting plate 612B disposed along a coaxial line. It should be noted that in FIG. 6, the mounting plate 612B differs from the mounting plate 112B by only the orientation of the hole pattern. In the embodiment shown in FIG. 6, the orientation of the holes in the second platform 110, load cell 112A, and mounting 612B are the same and are sized so as to allow a fastener (e.g., a bolt) to pass through each component and be secured with a nut to attach the components together. As for materials, the second platform 110 is preferably constructed from a material that substantially resists deformation at the forces that applied by system 100 to specimen 114 so as to ensure that any deformation is occurring at the specimen 114. In cases where the forces applied are relatively low, then platform 110 may be formed from a resin or a plastic, but if the forces are relatively high then high-strength steel, carbon fiber, or titanium are preferred. Having described the second platform 110, attention will now be directed to the plurality of actuator assemblies 106A-106F.

FIG. 7A is a perspective view of a first joint 104, a second joint 108, and an actuator assembly 106. Solely for clarity purposes, the position encoders 902A-F are not shown in FIGS. 7A and 7B, but a schematic diagram illustrating the connection of position encoder 902 to an exemplary actuator assembly 106 is shown in FIG. 7C. The plurality of actuator assemblies 106A-106F may be the same and thus for purposes of brevity, a description of a singular actuator assembly 106 will be provided. FIG. 7B is an exploded view of the first joint 104, the second joint 108, and the actuator assembly 106 shown in FIG. 7A. As discussed above, the overall function of the actuator assembly 106 is to move a piston 226 in a linear direction towards and away from the second platform 110 in accordance with a received instruction. Because the other end of the actuator assembly, namely mounting tube 202, is connected to a universal joint 104 which is, in turn, connected to the first platform 102, which may be considered immovable, the extension of the piston 226 results in a force and/or torque being applied to the second platform 110. As one of ordinary skill will appreciate, piston 226 is moved by hydraulic forces in accordance with servo valve 212, which operates based on a received instruction. Briefly, a hydraulic fluid is provided and supplied to actuator 106. More specifically, the hydraulic fluid transits through quick connects 214, a relief valve 216, tees 206 and 218, nipple connectors 210 and 220, accumulator 222 and 224, and a manifold 208 connected to a tie-rod cylinder 209. As pressure changes in accordance with the servo valve 212, the pressure changes in the tie-rod cylinder cause the piston 226 to move, or attempt to move, accordingly. The movement of the piston 226 is accurately recorded by the position encoder 902 which is attached thereto and the position information is provided to the local sense and control system 120, as discussed below.

FIG. 7C illustrates the operation of an exemplary position encoder 902 and its connection to other portions of actuator assembly 106. As shown in FIG. 7C, the position encoder 902 is a linear position encoder that includes a reading head 904 and a scale 906. The reading head 904 is movable relative to the scale 906. A portion of the scale 906 may, in an exemplary embodiment, be connected to mounting tube 202 in the vicinity of joint 104. The scale 906 may also be connected to another fixed portion of assembly 106 for stability. The reading head 904 is connected to piston 226 such that the motion of piston 226 causes the reading head 904 to move relative to the scale 906, and that motion, or the lack thereof, is measured. As shown in FIG. 7C and explained above, piston 226 may move relative to the tie-rod cylinder 209 and thus by virtue of the connection between piston 226 and the reading head 904, the position encoder 902 may record the motion of piston 226 and transmit information regarding the same to the local sense and control system 120. In one embodiment, the reading head 904 includes a cable connection that allows the position information to be outputted from the position encoder 902. Exemplary position encoders 902 may be models LR18, LR25, or LR35 manufactured by Gurley Precision Instruments.

Having described the general operation of an actuator assembly 106, attention will now be directed to sizing the plurality of actuator assemblies 106A-106F, and the components thereof, to meet the design requirements of system 100. The design of system 100 involves two main activities that in turn dictate the design of the rest of the components of system 100. The first main activity is the estimation of the main hydraulic components that aid in selecting appropriate hydraulic components (e.g., tie-rod cylinders and valve sizes). The second main activity is the development of a mathematical framework that, based on a geometric description of the physical structures of system 100 provides the permissible motion ranges for various frequencies at various external load conditions.

The sizing of the hydraulic components of the plurality of actuator assemblies begins with identifying the number of actuators. In system 100, six are provided. Next, the required experimental axial force, cyclic stroke, pressure and frequency are determined. With these quantities, the force per actuator 106, the required piston area, the displaced volume per cycle, the flow rate per cylinder, the total flow rate, and ultimately the required power can all be calculated. To illustrate the process, and provide the equations required for determining the unknown quantities, an example calculation is provided below in Tables 1-3.

TABLE 1

| | System Design Inputs | | | | | |
|---|---|---|---|---|---|---|
| | Actuator Assemblies | Total Force | Design Factor | Stroke | Pressure | Cyclic Rate |
| Label | B | C | D | E | F | G |
| Units | N/A | lbf | N/A | mm | psi | Hz |
| Value: | 6 | 20,000 | 1.25 | 15 | 3000 | 15 |

TABLE 2

| | System Calculations | | | | | |
|---|---|---|---|---|---|---|
| | Force | Force | Stroke | Pressure | Required Piston Area | Piston Diameter |
| Label | H | I | J | K | L | M |
| Units | Lbf | Newtons | Meters (m) | Pa | $m^2$ | m |
| Formula | D*C/B | H*4.48 | E/1000 | F*6894.76 | I/K | $2*\sqrt{(L/\pi)}$ |
| Value: | 4166.67 | 18533.3 | 0.015 | 20684280 | 8.96E−04 | 0.034 |

TABLE 3

| | System Calculations - continued | | | | |
|---|---|---|---|---|---|
| Design Inputs | Displaced Volume | Flow Rate | Flow Rate | Total Flow Rate | Total Power |
| Label | N | O | P | Q | R |
| Units | $m^3$/cycle | $m^3$/s | CFM | CFM | kW |
| Formula | L*J | N*G | O*2119 | B*P | (1/2)*I*J*B*G/1000 |
| Value: | 1.34E−05 | 0.0002 | 0.43 | 2.6 | 12.5 |

As shown in Table 1, if a system designer seeks to design a system with the specified design parameters/inputs (items B-G), then performance specifications of system 100 (items H-R) may be calculated from the equations shown in Tables 2 and 3. With these values in hand, the system designer can then select corresponding commercial parts that meet those specifications. For example, the system designer can select a piston 226 with diameter that matches the required piston diameter. The system designer may then assemble those components to form an actuator assembly 106 that matches those specifications.

In addition to sizing the plurality of actuator assemblies 106A-106F, in one embodiment the shape and size of the first platform 102 and the second platform 110 and the locations at which the plurality of actuator assemblies 106A-106F attach to those platforms may be optimized. As one of ordinary skill will appreciate, the locations at which the joints 104A-104F and 108A-108F attach to the first platform 102 and second platform 110, respectively, may be changed from the embodiment described above. The location of these attachment points define the "forward" kinematics of system 100, i.e., these locations determine the motion of platform 110 resulting from the motion of the plurality of hydraulic actuators 106A-106F. In one embodiment, once the components for the plurality of actuator assemblies 106A-106F have been selected based on the calculations above, then their physical size and range of motion during operation are set. Using that information, a nonlinear constrained optimization problem is created which may be solved by conventional algorithms. The optimization problem is constrained because the range of motion of the actuator assemblies 106A-106F during operation is fixed because of the parts selection and the fact that the plurality of actuator assemblies 106A-106F must be arranged to avoid collisions when in operation. The solution to the optimization problems is the size and shape of the platforms 102 and 110 and the location of preferred attachment points for the plurality of actuators 106A-106F with respect to platforms 102 and 110. Based on those values, an appropriately size load cell 112A and mounting plate 112B may then be selected.

In another embodiment, however, the system designer can dictate these parameters. This may be the case where a system 100 has already been constructed and one wishes to modify the system to test a different material over a different range of forces and cyclic rates. The already constructed system 100 will have a given response, and that response may be modified by defining the properties of some parts of the plurality of actuator assemblies 106A-106F, for example the length of the piston rod 226, and defining the attachment points in a three-dimensional space, while the remaining components can be replaced based on the calculations above and commercially available parts. Once those selections are made, the modified system 100 may be modeled to determine the response of the system. If the response of the system 100 departs significantly from the design specification, then the process may be repeated until the response matches the design. Having described the plurality of actuator assemblies 106A-106F, attention will now be directed to the first platform 102.

FIG. 8 is a perspective view of an exemplary platform 102. Platform 102 connects the plurality of actuator assemblies 106A-106F to a support 103. Holes 802A-802F are constructed to receive the universal joints 104A-104F from the plurality of actuator assemblies 106A-106F, respectively. Holes 804A-804J are for bolts, screws, or other fasteners that allow platform 102 to be connected to support 103 and remain essentially immovable with respect to support 103 during the operation of system 100 so as not to significantly affect the performance of system 100. Having described the electromechanical stack 200 of system 100 and how parts for system 100 may be selected, attention will now be directed to the computational stack 300, the components thereof, and the operation thereof.

FIG. 9 is a communications diagrams showing the communications between components of the computational stack 300 and the electromechanical stack 200 according to one embodiment. As shown in FIG. 9, and described above, a computer 122 may be provided in one embodiment through which the user can define the loading specifications for specimen 114 and see the results of the testing. Also shown in FIG. 9, is the local sense and control system 120 that includes three subcomponents: a real time kernel Linux system 904, sensor electronics 906, and a 6-DoF controller 908. As shown in FIG. 9, the computer 122 communicates with the Linux system 904 to send and receive instructions and data via a digital signal. In this exemplary embodiment, the connection between computer 122 and Linux system 904 is a TCP/IP connection. The Linux system 904 in turn is connected to the sensor electronics 906 via, in this embodiment, a USB (universal serial bus) connection. This allows system 904 to pass and receive instructions and data from the sensor electronics 906. System 904 is also connected to a six degree of freedom (6-DoF) control 908 via, in this embodiment, a USB connection. This connection allows system 904 to send commands to the 6-DoF controller which then, based on those commands, sends instructions to the servo valve 212 in each of the plurality of actuator assemblies 106A-106F. As explained above, the servo valve 212 responds in accordance with the received instruction and causes the piston 226 to move accordingly. The sensor electronics 906 is also constructed to receive signals carrying information about the applied forces and torque from the load cell 112A. In addition, the sensor electronics 906 may receive a signal from a position encoder 902 in each of the plurality of actuator assemblies 106A-106F that contains information on the respective positions of the plurality of actuator assemblies 106A-106F. Finally, system 904 may also receive a signal carrying information from the DSI subsystem 118. The DSI subsystem 118 may include a camera for imaging a region of the specimen 114 during the testing. However, it is possible that another region of interest by outside the field-of-view of a single camera. As such, in one embodiment, the DSI subsystem 118 may include two cameras for monitoring respective subregions of specimen 114. Each of these cameras may capture images of the specimen 114 during the operation of system 100. More specifically, the user may define, via computer 122, areas of specimen 114 to be monitored which serve as virtual strain sensors. The DSI subsystem 118 may include a separate processor, processor, and display. The DSI subsystem 118 processor and memory may be configured to capture and process images recorded by the camera(s) from the area(s) containing the virtual strain sensors of interest, monitor the strain tensor component histories at user-specifiable locations, and display, on the DSI subsystem 118 display, the time-dependent strain histories for each of the virtual stories as well as store the same in memory. This information may also be passed to computer 122 and displayed there.

FIG. 10 is a schematic communications diagram showing the connections of the sensor electronics 906. Sensor electronics 906 may be embodied on a printed circuit board that includes a microcontroller 1006, position encoder connections 1002A-1002F, an analog-to-digital (ADC) converter 1008, and a load cell connector 1004. Microcontroller 1006 in turn may be communicatively connected to system 904. In one embodiment, system 100 employs motion predictive control (MPC) to enable an intermittent update approach. This type of control is a viable option because system 100 will mostly be performing repetitive motions. To enable MPC, commands will be sent to the plurality of actuator assemblies 106A-106F and information on the state of those actuator assemblies 106A-106F will be received to prepare for future motion commands. This process involves receiving information from both the position encoders 902 and load cell 112A. As shown in FIG. 10, microcontroller 1006 is communicatively connected to the plurality of encoder connections 1002A-1002F. As one of ordinary skill will appreciate, it is desirable that the information from the encoders is received with minimal latency so as to allow time for MPC. To accomplish that, a pin from the microcontroller 1006 that acts a clock (and paced at a selected but not necessarily constant interval) is converted through a transceiver to the appropriate differential level. This ensures that each position encoder 902 of the plurality of actuator assemblies 106A-106F are commonly clocked. The data from each position encoder 902 returns to microcontroller 1006 on separate pins and their state can be read serially, gradually building up the data bits.

Turning to connections between sensor electronics 906 and the load cell 112A, FIG. 11 is a schematic communications diagram showing connections between components of sensor electronics 906, which may be located on the printed circuit board described above, and the load cell 112A. As shown in FIG. 11, a serial peripheral interface (SPI) connection may be established between the microcontroller 1006 and the ADC 1008. For low noise differential operation, the analog subsystem of the ADC 1008 is powered by a dual-rail low noise charge pump with +/−1.65V, in this embodiment. The charge pump 1102 operates a 2 MHz and is followed by a low dropout linear regulator that further reduces the ripple noise of the system. Each of the full bridges of the six load cells in load cell 112A is excited by the same lower noise 1.65V charge pump. The load cell differential analog signals are filtered through a low pass filter. In one embodiment, an RC circuit with a cutoff at 3 KHz may be provided as the low pass filter. The filtered signal is then routed to the differential pins of the ADC 1008. Having described the components of the computational stack 300, attention will now be directed to the operation of system 100.

As discussed above, system 100 allows for the testing of specimen 114 by exposing the same to any load and/or displacement and/or rotation that is produced by the linear combination of the plurality of actuator assemblies 106A-106F acting through the platforms 102 and 110 which create 6-DoF load or kinematic space. To begin testing of specimen 114, a loading specification is entered by a user via computer 122. The loading specification includes the frame of reference location with respect to the platform frame of reference. In addition, the loading specification also includes either: (i) the waveform evolution of each of the six load components (three forces and three moments); or (ii) the waveform evolution of the 6 degrees of freedom of a point in space (three translations and three rotations). Computer 122 then validates that system 100 can apply the specified loading, particularly with respect to (i) the force range of the plurality of actuator assemblies; (ii) the force range of the mechanical components; (iii) the displacement range of the actuators; and (iv) the combined load, displacement, frequency, and velocity. If the computer 122 validates the specified loading, then test procedure may begin.

The testing procedure begins by starting system 100 in a "position control" state to hold the plurality of actuator assemblies 106A-106F in their present position. The system 100 is then moved into its home position. The specimen 114 is then fixed to the mounting plate 112B and the specimen support 116. Next, the desired waveform is supplied from computer 122 to system 904. The camera(s) and any necessary lights of the DSI system 119 are then positioned to observe and record the specimen 114. Then, a position control or force control mode is selected and the test begins. It should be noted that the computer 122 can also exert other control modes over system 100. For example, computer 122 can send commands to directly set the voltages of the plurality of actuator assemblies 106A-106F or to set the desired position that each of the plurality of actuator assemblies 106A-106F should move to. In an "actuator pose control" mode, the user may also set the components of a generalized displacement (three rotations and three translations) with respect to a predefined point in space. In a "cyclic control" mode, the user may define a cyclic mode that accepts average, frequency, magnitude, and phase for each individual component of the generalized displacements. Having described the construction and operation of system 100, some of the benefits of system 100 will now be discussed.

One of the advantages of system 100 is that it is modular and reconfigurable to apply mDoF time vary loads to different specimens and structural components. System 100 is able to apply all possible mutliaxiality combinations to three time-dependent translations and three time-dependent rotations about a user defined frame of reference. Effectively, the system can apply six single DoF excitations, 15 combinations of 2-DoF excitations, 20 combinations of 3-DoF excitations, 15 combinations of 4-DoF excitations, 6 combinations of 5-DoF excitations and 1 combination of 6-DoF excitations, for a total of 63 mutiaxial excitations scenarios. If each DoF is allowed to have both positive and negative values, then the excitation scenarios increase to 728. System 100 is capable of transitioning, in accordance with a loading specification, from one multiaxiality combination to another of which may be a different order in terms of degrees-of-freedom. System 100 is able to apply high authority excitation that combines high loads and high displacements or rotations at the same time, while allowing those excitations to evolve in time with a multispectral deterministic or even random content. System 100 is preferably constructed with materials that exhibit sufficient stiffness such that structural components of system 100 do not allow storage of elastic deformation energy thus enable the specimen under test to absorb most if not all of the applied excitation energy. System 100 exhibits very low hysteresis and backlash thus enabling load reversal in time as required by fatigue loading general requirements. The displacement resolution of system 100 is fine enough to support deformation measurements of stiff material systems. In one embodiment, the available motion range in each DoF is optimized and is large enough to capture the full range of the material loading path in space and time. The force range capacity in each of the plurality of actuators 106A-106F is large enough to bring the specimen to "fatigue induced failure" but have enough resolution to capture the incipient behavior at small displacements. Single axis displacement transducers (position encoders) are reducible to the 6-DoF displacement and rotation measurement capability with multispectral time-controlled variability. System 100 is able to be reconfigured with various sets of attachments that can accommodate the geometry of many specimen shapes and structural components. System 100 is able to measure the full field or localized displacements and strain from any user definable virtual sensor locations.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A multiple degree-of-freedom fatigue testing apparatus, comprising:

a first platform;

a second platform;

a plurality of actuator assemblies where each actuator assembly includes a servo-control, a position encoder, and a piston that is constructed to move in a linear direction in accordance with the servo-control, wherein each piston of the plurality of actuator assemblies is rotatably connected to the second platform;

a load cell connected to the second platform and constructed to output force measurements in three orthogonal directions and torque measurements about the three orthogonal directions;

a mounting plate constructed to hold a portion a specimen;

a specimen support constructed to hold another portion of the specimen;

a strain-imaging system comprising a camera constructed to record a plurality of images of the specimen during fatigue testing; and a local sense and control system constructed to receive: a loading specification, the force measurements and torque measurements from the load cell, and position information from each position encoder, and output control commands to each servo-control of the plurality of actuator assemblies based on the received loading specification, wherein the control commands are updated in time in accordance with the position information from each position encoder and the force measurements and torque measurements from the load cell.

2. The apparatus of claim 1, wherein the mounting plate is removably connected to the load cell.

3. The apparatus of claim 1, wherein the second platform comprises a resin, a plastic, high-strength steel, carbon fiber, or titanium.

4. The apparatus of claim 1, wherein each actuator assembly includes a first joint and a second joint, wherein each actuator assembly is connected to the first platform through the first joint and connected to the second platform through the second joint.

5. The apparatus of claim 4, wherein the second joints of the plurality of actuator assemblies are spherical joints, and wherein the second platform includes a plurality of studs each of which includes a ball portion at one end, and wherein each ball portion is connected to a corresponding spherical joint.

6. The apparatus of claim 1, wherein the position encoder includes a reading head and a scale, wherein the reading head is connected to a corresponding piston and movable relative to the scale.

7. The apparatus of claim 1, wherein the loading specification includes a frame of reference location with respect to a platform frame of reference.

8. The apparatus of claim 1, wherein the loading specification also includes either: (i) a waveform evolution for three forces in the three orthogonal directions and three torques about the three orthogonal directions, or (ii) a waveform evolution of six degrees of freedom of a point in space.

9. The apparatus of claim 1, wherein the camera of the strain-imaging system is constructed to image a portion of the specimen that is a virtual strain sensor.

10. The apparatus of claim 9, wherein the strain-imaging system includes a second camera constructed to image another portion of the specimen that is another virtual strain sensor.

* * * * *